United States Patent Office 2,726,984
Patented Dec. 13, 1955

2,726,984

COMPOSITION FOR COMBATTING AMOEBIASIS COMPRISING 1:2 - BIS(4' - ARSONO - PHENYL-AMINO) - ETHANE

Bernard Beas and Phillipe Kerny, Paris, France, assignors to Societe des Usines Chimiques Rhone-Poulenc, Paris, France, a French body corporate No Drawing. Application September 17, 1952, Serial No. 310,128

Claims priority, application Great Britain June 26, 1952

2 Claims. (Cl. 167—69)

This invention is for improvements in or relating to arsenical compositions and has for its object to provide new arsenical compositions having therapeutic application.

As a result of research and experimentation it has been found that 1:2-bis(4'-arsono-phenylamino)-ethane and its salts are effective in the treatment of parasiticidal diseases, in particular amoebiasis, while being devoid of unpleasant secondary effects.

The present invention, accordingly, provides pharmaceutical preparations containing the stated ethane derivative or a salt thereof for use in combatting parasiticidal diseases, in particular amoebiasis.

According to the present invention the aforesaid ethane derivative or a salt thereof may be associated with a carrier which may be either a solid material or a sterile parenteral liquid. The compositions may take the form of tablets, powders, capsules, or other dosage forms which are particularly useful for oral ingestion. Liquid diluents are employed in sterile condition for parenteral use, that is, by injection. Such a medium may be a sterile solvent such as water. The compositions of the invention may take the form of active material, admixed with solid diluents and/or excipients such as starch, lactose, talc, stearic acid, magnesium stearate, gums or the like. Any of the tabletting materials used in pharmaceutical practice may be employed where there is no incompatability with the said ethane derivative or salt thereof. Alternatively, the ethane derivative or salt thereof may, with or without its adjuvant material, be placed in the usual capsule or resorbable material such as the usual gelatin capsule and administered in that form.

In yet a further embodiment, the ethane derivative or salt thereof may, as such or in the form of a diluted composition, be put up in powder packets and employed as such. Or the ethane derivative, or salt thereof, may be prepared in the form of a suspension in a material in which the active substance is not itself soluble.

The percentage of active ingredient in the compositions of the invention may be varied, it being necessary that it should constitute a proportion such that a suitable dosage shall be obtained. Obviously several unit dosage forms may be administered at about the same time. In general, the preparations of the present invention should normally contain at least 1%, preferably 5–75%, of active substance.

The following formulations are intended to be illustrative only and they may be varied or modified to a considerable extent without dpearting from the spirit of the invention.

*Example I*

Tablets are prepared having the following formula:

|  | G. |
|---|---|
| Sodium salt of 1:2-bis(4'-arsono-phenylamino)-ethane | 0.748 |
| Starch | 0.112 |
| Levilite | 0.100 |
| Magnesium stearate | 0.040 |

*Example II*

Suppositories are prepared containing:

|  | G. |
|---|---|
| Sodium salt of 1:2-bis(4'-arsono-phenylamino)-ethane | 0.75 |
| Cocoa butter | 2.25 |

*Example III*

Vaginal suppositories are prepared containing:

|  | G. |
|---|---|
| Sodium salt of 1:2-bis(4'-arsono-phenylamino)-ethane | 0.75 |
| Cocoa butter | 14.25 |

*Example IV*

50 g. of the sodium salt of 1:2-bis(4'-arsono-phenylamino)-ethane are dissolved in water, the solution is made up to 1000 cc., and distributed into ampoules which have been sealed and sterilised in an autoclave for a period of 20 minutes at 120° C.

*Example V*

The procedure of Example IV is followed but using 100 g. of the sodium salt of 1:2-bis(4'-arsono-phenyl-amino)-ethane.

We claim:

1. A composition for combatting amoebiasis, comprising between 5 and 75% by weight of a member selected from the class consisting of 1:2-bis(4'-arsono-phenyl-amino)-ethane and its salts and a significant amount of a solid pharmaceutical carrier.

2. A composition in dosage unit form for combatting amoebiasis, comprising between 5 and 75% by weight of a member selected from the class consisting of 1:2-bis(4'-arsono-phenylamino)-ethane and its salts and a significant amount of a solid pharmaceutical carrier, said composition being in tablet dosage form.

References Cited in the file of this patent

Burger: Medicinal Chemistry, vol. II, Interscience Publishers, New York, 1951, pages 861, 862, 957.

Ludwig: Repertorium Pharm. Spezialpräparate, pages 3, 903, Beobachter, Basel, 1948.

J. A. C. S., vol. 45, 1923, page 2753.